(12) United States Patent
Eriksson

(10) Patent No.: US 11,514,116 B2
(45) Date of Patent: Nov. 29, 2022

(54) MODIFYING CONTENT TO BE CONSUMED BASED ON PROFILE AND ELAPSED TIME

(71) Applicant: Interdigital Madison Patent Holdings, SAS, Paris (FR)

(72) Inventor: Brian Eriksson, San Jose, CA (US)

(73) Assignee: InterDigital Madison Patent Holdings, SAS, Paris (FR)

( * ) Notice: Subject to any disclaimer, the term of this patent is extended or adjusted under 35 U.S.C. 154(b) by 442 days.

(21) Appl. No.: 16/067,584

(22) PCT Filed: Dec. 30, 2015

(86) PCT No.: PCT/US2015/068148
§ 371 (c)(1),
(2) Date: Jun. 29, 2018

(87) PCT Pub. No.: WO2017/116443
PCT Pub. Date: Jul. 6, 2017

(65) Prior Publication Data
US 2019/0012391 A1  Jan. 10, 2019

(51) Int. Cl.
*G06F 16/00* (2019.01)
*G06F 16/9535* (2019.01)
*G06Q 30/02* (2012.01)

(52) U.S. Cl.
CPC ......... *G06F 16/9535* (2019.01); *G06Q 30/02* (2013.01)

(58) Field of Classification Search
None
See application file for complete search history.

(56) References Cited

U.S. PATENT DOCUMENTS

| | | | |
|---|---|---|---|
| 8,548,529 B1 * | 10/2013 | Kessenger | H04M 1/72448 455/566 |
| 8,549,550 B2 | 10/2013 | Lopatecki et al. | |
| 9,253,533 B1 * | 2/2016 | Morgan | H04N 21/4325 |
| 9,672,534 B2 * | 6/2017 | Mahajan | H04N 21/2668 |
| 10,088,983 B1 * | 10/2018 | Qaddoura | H04N 21/23439 |
| 10,127,195 B2 * | 11/2018 | Bliss | G06F 40/166 |
| 2001/0044739 A1 | 11/2001 | Bensemana | |
| 2007/0208751 A1 * | 9/2007 | Cowan | G06Q 10/10 |
| 2007/0260627 A1 * | 11/2007 | Knittel | G06Q 30/02 |
| 2009/0115776 A1 * | 5/2009 | Bimbra | G06T 19/00 345/530 |
| 2009/0119710 A1 | 5/2009 | Lo et al. | |
| 2010/0333137 A1 | 12/2010 | Hamanno et al. | |
| 2011/0088054 A1 * | 4/2011 | Malik | G10L 13/00 725/29 |

(Continued)

FOREIGN PATENT DOCUMENTS

CN   1413330 A    4/2003
CN   101502075 A   8/2009

(Continued)

*Primary Examiner* — Bai D Vu
(74) *Attorney, Agent, or Firm* — Condo Roccia Koptiw LLP

(57) ABSTRACT

A method and apparatus to distribute content to a user based on a consumption profile associated with the user is described. Based on the consumption profile associated with the user and a length of time between content creation and content consumption the content is modified. After the content is modified, the content is transmitted and/or provided to a user device.

17 Claims, 11 Drawing Sheets

(56) References Cited

U.S. PATENT DOCUMENTS

| | | | |
|---|---|---|---|
| 2012/0072956 | A1 | 3/2012 | Thomas et al. |
| 2013/0064525 | A1* | 3/2013 | Cary .................... G11B 27/105 |
| 2014/0059432 | A1 | 2/2014 | Johansson et al. |
| 2014/0314389 | A1 | 10/2014 | Mese |
| 2015/0121408 | A1 | 4/2015 | Jacoby et al. |
| 2015/0331240 | A1* | 11/2015 | Poulos .................. G06T 19/006 345/8 |

FOREIGN PATENT DOCUMENTS

| | | | |
|---|---|---|---|
| CN | 102165436 | A | 8/2011 |
| CN | 102460496 | A | 5/2012 |
| CN | 105144081 | A | 12/2015 |
| JP | 2004200733 | A | 7/2004 |
| JP | 2011503717 | A | 1/2011 |
| JP | 2012532491 | A | 12/2012 |
| WO | 01/46876 | A2 | 6/2001 |
| WO | 2007/146552 | A2 | 12/2007 |
| WO | 2010/036485 | A1 | 4/2010 |
| WO | 2010/135001 | A2 | 11/2010 |
| WO | 2014/165078 | A1 | 10/2014 |
| WO | 2014/200944 | A2 | 12/2014 |

* cited by examiner

MODIFYING CONTENT TO BE CONSUMED BASED ON PROFILE AND ELAPSED TIME

CROSS REFERENCE TO RELATED APPLICATIONS

This application is the national stage entry under 35 U.S.C. § 371 of International Application PCT/US2015/068148, filed Dec. 30, 2015, which was published in accordance with PCT Article 21(2) on Jul. 6, 2017, in English.

BACKGROUND

Many users consume various types of multimedia content in various different ways. Before even deciding what content to consume, a user may be provided with multiple options and types of content to consume where such content begins to accumulate after a short period of time. The storage and indexing of such content which has yet to be consumed can occupy gigabytes of storage and it can be difficult for a user to select what content to consume after so much content has accumulated.

Thus there is a need for ways to provide meaningful content to a user while limiting what content is provided to the user.

SUMMARY

Some embodiments provide ways to distribute content to users. Such content can be provided to each user based on a consumption profile associated with the user. Such a consumption profile can be related to various presentation attributes associated with previous consumption by the user. Such attributes can include, for instance, color, volume, number of items viewed without stopping, number of items viewed in a session, etc.

In addition, consumption profiles can include information related to playback commands (e.g., a pause command). Such information can include, for example, command probability associated with various points along a timeline, command duration, etc.

Some embodiments can associate user consumption profiles based on various relevant factors such as viewer demographic information, preferred content type or genre, etc.

Consumption profiles can be generated for content items and/or sets of items in some embodiments. For instance, consumption profiles of associated users (e.g., users with similar or matching demographic information) can be combined to generate a consumption profile for a content item. In addition, content items can include consumption information (e.g., scene transition times, length, etc.) that can be used to generate profiles.

Some embodiments can provide various user interface (UI) elements that can allow a user to receive and accept or decline suggestions, invoke recommendations, and/or otherwise manipulate content presentation.

The preceding Summary is intended to serve as a brief introduction to various features of some exemplary embodiments. Other embodiments can be implemented in other specific forms without departing from the scope of the disclosure.

BRIEF DESCRIPTION OF THE SEVERAL VIEWS OF THE DRAWINGS

The exemplary features of the disclosure are set forth in the appended claims. However, for purpose of explanation, several embodiments are illustrated in the following drawings.

DETAILED DESCRIPTION

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various features are described below that can each be used independently of one another or in combination with other features. Broadly, some embodiments generally provide ways to distribute content to users based on consumption profiles associated with the users and/or content items.

In some exemplary embodiments, a method is described that identifies a consumption profile for a user. The method also has content being modified in view of the consumption profile and a length of time between content creation and content consumption. In the last part of the method, the modified content is transmitted and/or provided.

In other exemplary embodiments, a server is described that identifies a consumption profile for a user. The server also has content being modified in view of the consumption profile and a length of time between content creation and content consumption. In the last part of the method, the modified content is transmitted and/or provided.

In some other exemplary embodiments, apparatus is described that identifies a consumption profile for a user. The server also has content being modified in view of the consumption profile and a length of time between content creation and content consumption. In the last part of the method, the modified content is transmitted and/or provided. In these embodiments, the content is modified directly in a device without having to obtain the content from a server at the time of consumption.

Several more detailed embodiments are described in the sections below. Section I provides a description of a content delivery system architecture of some embodiments. Section II then describes various exemplary consumption profiles of some embodiments. Next, Section III describes UI features of some embodiments. Section IV then describes various exemplary methods of operation used by some embodiments. Lastly, Section V describes a computer system which implements some of the embodiments.

I. System Architecture

Figure 1:
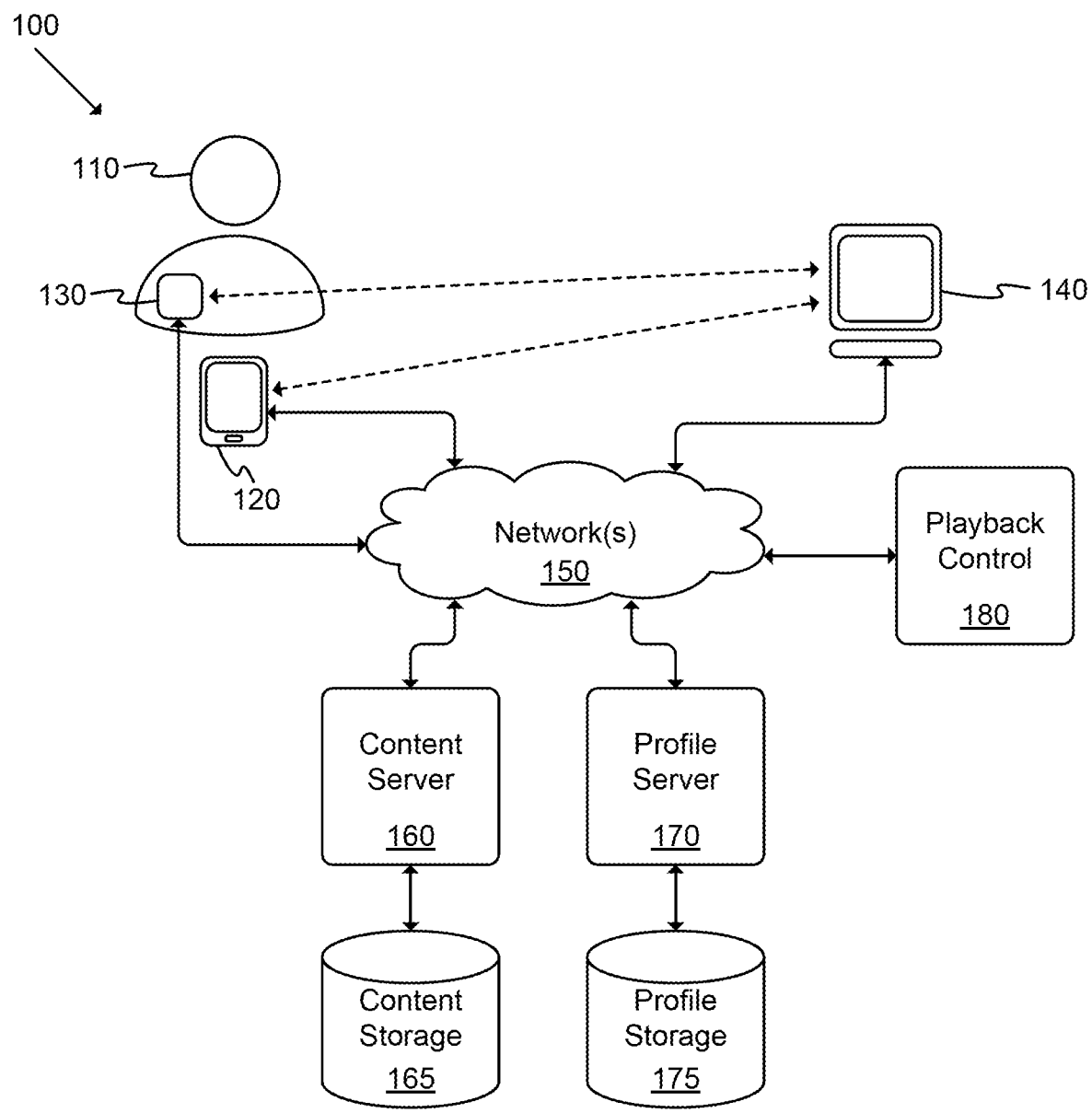
FIG. 1 illustrates a schematic block diagram of content delivery system according to an exemplary embodiment.

FIG. 1 illustrates a schematic block diagram of content delivery system 100 according to an exemplary embodiment. Specifically, this figure shows the various communication pathways among system elements. As shown, the system can provide multimedia content to at least one user 110. Each user can be associated with one or more mobile devices 120, wearable devices 130, and/or other appropriate devices. In addition, the system can include a display 140, network 150, content server 160, content storage 165, profile server 170, profile storage 175, and playback control module 180.

Each mobile device 120 can be an electronic device capable of communicating across one or more networks 150 and/or interacting with display 140 and/or other system elements. The mobile device 120 can be, for instance, a smartphone, tablet, laptop, etc.

Wearable device 130 can be an electronic device capable of communicating with other system elements, measuring biometric data (e.g., heart rate, body temperature, skin moisture, etc.), determining location, and/or performing other appropriate functions. The wearable device can be, for example, a watch, bracelet, ring, necklace, badge, etc. Such devices can be able to identify an emotional state of the wearer based on location, biometric data, and/or other appropriate factors (e.g., time of day, ambient light level, etc.).

The display 140 can be an electronic device able to provide multimedia content. Such content can include, for instance, video, audio, graphical elements, etc. The display can be a television, monitor, projector, and/or other appropriate device. The display can include and/or interact with other appropriate elements. For instance, some embodiments can include a set-top box, computing device, and/or other appropriate resource that supplies content to the display. In some embodiments, mobile device 120 can server as the display (e.g., when a user views content on a tablet).

The display 140 can further include associated resources such as a remote control that can allow the user 110 to interact with the display. Alternatively, a device such as mobile device 120 or wearable device 130 can interact with the display (e.g., via a local link or connection, via one or more networks, etc.) in order to at least partly control the presentation of content. In some embodiments, the user devices 120-130 can be used to control the presentation of content via other system elements. For instance, device 120 can send a message to the content server 160 which, in turn, causes some change to the content provided to display 140.

The network(s) 150 can provide various communication pathways available to the system elements. The network can include one or more local wired or wireless networks, distributed networks, cellular networks, the Internet, etc.

The content server 160 and associated storage 165 can be able to store content items and provide the content items to various other system resources (e.g., display 140). In some embodiments, system elements can be able to access the storage 165 via an application programming interface (API) or other appropriate resource without interacting with server 160.

The profile server 170 and associate profile storage 175 can be able to store consumption profiles and provide the profiles to other system resources (e.g., display 140, playback control 180, etc.). In some embodiments, system elements can be able to access the storage 175 via an API or other appropriate resource without interacting with server 170.

Profile server 170 can also be implemented to contain information about the organization of different media. For example, profile server 170 can contain information about a sports event as a video where the times when certain players scored and can be stored where such information can be matched to different segments of video using timecodes. These segments that be highlights that represent a subset of the media. Other forms of media (types of content including movies, television shows, concerts, news programs, sports, and the like) can be excerpted to produce highlights (for example, movies can show only the action scenes, produce the funny scenes in a television show, certain songs from a rock concert, international news from a news program, and the like) in accordance with the disclosed principles.

The playback control module 180 can be an electronic device, such as a server, that is able to interact with the other system elements to implement control functions and parameter adjustments based on consumption profiles. In some embodiments, the content server 160, profile server 170, and/or playback control 180 can be implemented using a single server device (or associated set of server devices).

One of ordinary skill in the art will recognize that system 100 is provided for example purposes and that the system can be implemented in various different ways without departing from the scope of the disclosure. For instance, the various elements can be arranged in various different ways that use various different communication pathways. As another example, additional components can be included and/or some listed components can be omitted. In addition, various elements can be combined with other elements and/or divided into sets of sub-elements.

II. Consumption Profiles

Figure 2A:
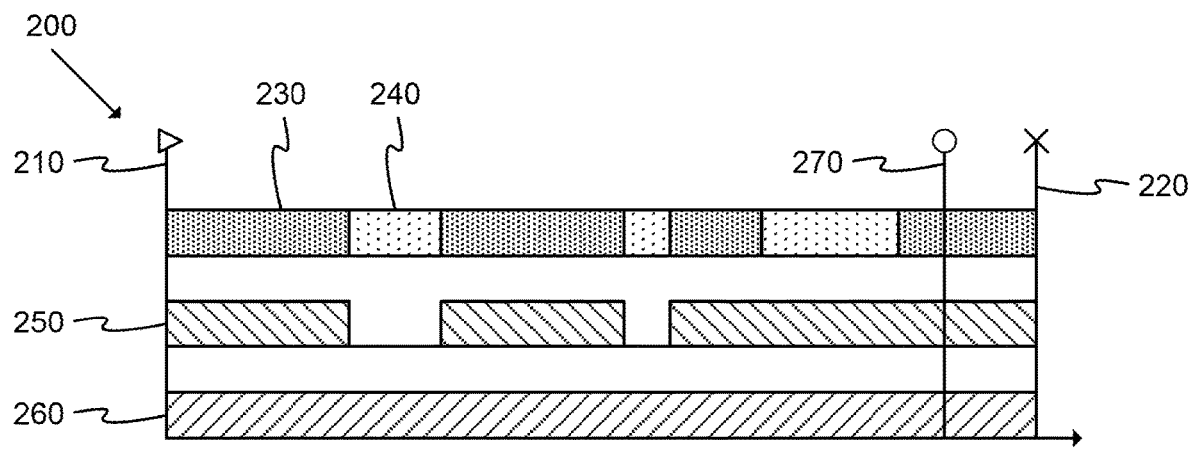
FIG. 2A illustrates an exemplary timeline of commands related to a content playback session of some embodiments.

FIG. 2A illustrates an exemplary timeline 200 of commands related to a content playback session of some embodiments. In this example, the commands include "play" and "pause".

A consumer begins playback at origin 210 and continue to an end 220 of the session. The play time is reflected by area 230 using a first fill pattern. The consumer can then pause playback during the time reflected by area 240 using a second fill pattern. Additional pause 240 and play 230 periods are continued along the timeline until the end 220 of the session.

In a first example, the content 250 includes discrete items (e.g., episodes of a TV series, related sets of clips, etc.). In a second example, the content 260 includes a single continuous item (e.g., a movie, a sporting event, etc.). The play 230 and pause 240 periods can be used for the first and second example. In addition, this example, includes a marker 270 that can relate to various elements of the consumed content (and/or other relevant factors).

In the first example, a user consumes an entire episode before pausing for a period of time. The user then resumes playback at the beginning of a second episode and again pauses playback at the end of the second episode. The user then resumes playback at the beginning of the third episode, pauses during the episode, and resumes playback to the end of the episode before ending the viewing session. In this example, the marker 270 can represent a commercial break in the episode, a scene end point, etc.

In the second example, a user consumes a single content item such as a sporting event, with several pauses in viewing. In this example, the marker 270 can represent a context-relevant point within the content (e.g., two minutes left in a basketball game).

An end point of a viewing session can be determined based on various relevant factors such as time since last command received, lack of additional content, a specific command such as a "stop" command, etc.

The profile information can be stored in various appropriate ways (e.g., using a database, look-up table, etc.) and can include various appropriate elements. Such elements can include, for example, session start and end, command receipt times, content attributes (e.g., type, length, etc.), external attributes (e.g., time of day, playback device type or model, etc.), etc. In addition, the profile can include provider information such as content type (e.g., broadcast, streaming, etc.), delivery channels (e.g., wireless network, cellular network, etc.), and/or user information, such as demographic information, group affiliation, preferences, etc.

Sources of profile information can be weighted based on various relevant factors. For instance, some embodiments can weight information related to viewings of purchased content more heavily than viewings of streaming content, as users can typically have more knowledge of the content based on previous viewings.

Although these examples refer to specific commands, one of ordinary skill in the art will recognize that other commands and/or attributes can be profiled in similar ways. For instance, some embodiments can store profiles related to various commands and/or settings such as volume, color, brightness, etc. A single profile can include data related to multiple users, multiple commands, and/or multiple attributes.

Figure 2B:
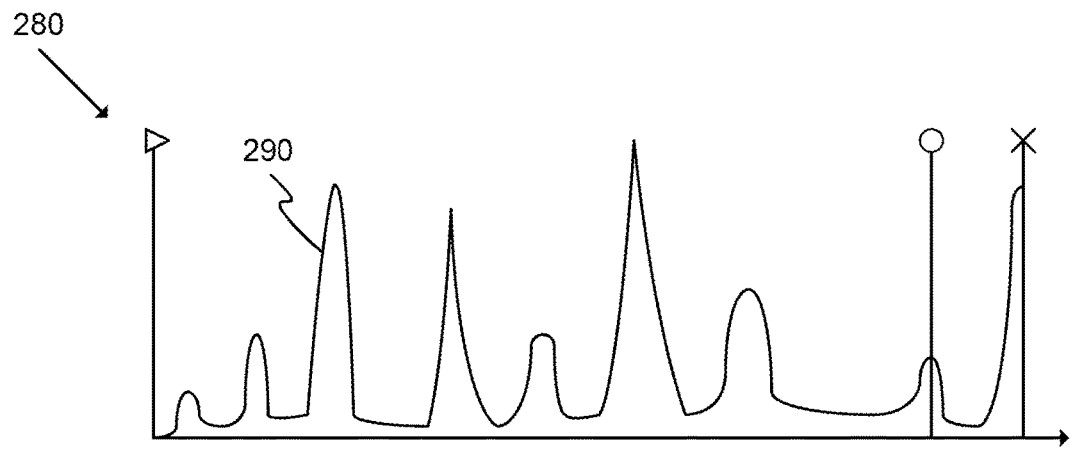
FIG. 2B illustrates an exemplary timeline of a probabilistic consumption profile of some embodiments.

FIG. 2B illustrates an exemplary timeline 280 of a probabilistic consumption profile of some embodiments. In this example, the probability curve 290 can relate to a command such as the play/pause command in the example above. Such a profile can include data that is averaged over a group of users and/or a group of content items. In the first example above, the probability of a pause command can increase near the end of an episode or scene, for instance. Such a probability curve can be used by some embodiments to determine whether or when to implement some command (and/or attribute adjustment).

In some embodiments, the probabilistic profile can be scaled or otherwise modified based on real-time factors (e.g., emotional state of viewer). For instance, a user can typically watch three episodes of a show in a row before pausing, but if a wearable device indicates tiredness or boredom, a pause can be suggested after two episodes. Conversely, if the user showed heightened attentiveness, a pause recommendation might not be made until after four episodes.

As another example, the probability curve can be scaled or otherwise modified based on various user actions. For instance, if a user adjusts a display attribute, a pause suggestion can not be made for some period of time regardless of the probability threshold.

In addition to representing the probability of a pause itself, some embodiments can include other attributes related to the command or display attributes. For instance, some embodiments can include an average pause time associated with each pause location along the timeline.

Figure 3:
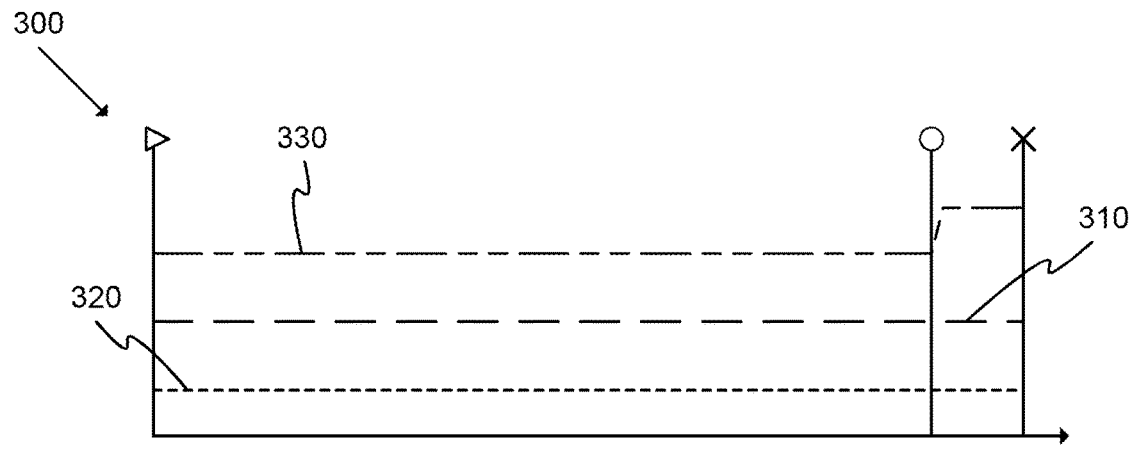
FIG. 3 illustrates an exemplary timeline of attributes related to a consumption profile of some embodiments.

FIG. 3 illustrates an exemplary timeline 300 of attributes related to a consumption profile of some embodiments. In this example, the attributes can be related to a particular user and associated with a particular genre. Such representative profiles can be generated for multiple users, genres, content items, etc. The profile can include a first attribute 310 such as a color setting, and a second attribute 320 such as brightness, that do not change during viewing of the related content items. Such settings can be varied according to user category, content type, genre, display type, etc.

This example further includes a third attribute 330 that changes at marker 270. Such changes can be associated with a probability threshold and/or other appropriate criteria. In this example, the third attribute can represent volume and the user can have increased (or be likely to increase) volume at that point based on various relevant factors (e.g., scene content, time within a sport contest, etc.). Some profiles can include multiple attribute adjustments that can be associated with various features of the content. For instance, volume can be lowered during loud action scenes and increased during quiet dialog.

One of ordinary skill in the art will recognize that the consumption profiles can be related to various attributes, commands, etc. and can be collected and/or associated in various appropriate ways. Cumulative profiles can include individual profiles that are associated based on factors related to the user (e.g., age, gender, etc.), content (e.g., type, genre, etc.), and/or other relevant groupings.

III. User Interface

Figure 4:
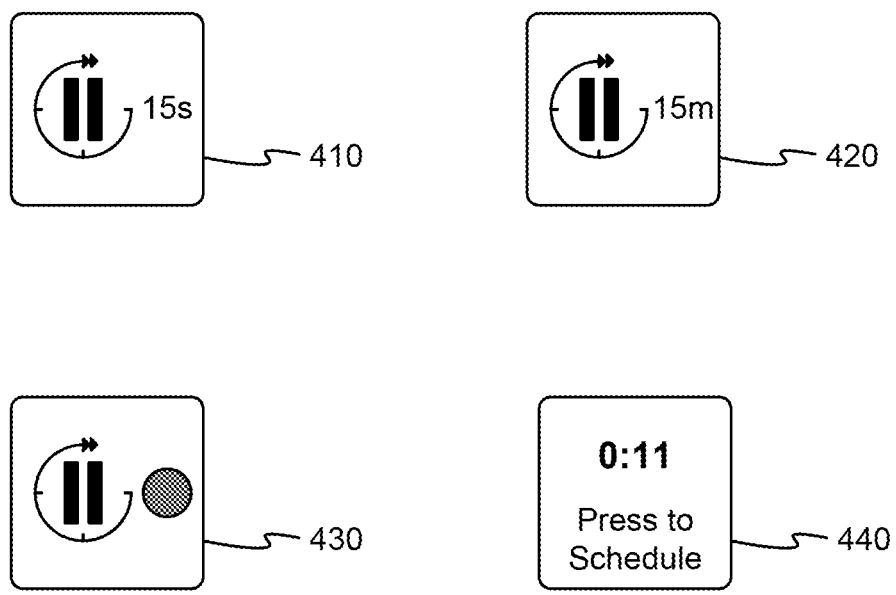
FIG. 4 illustrates front views of various exemplary graphical user interface (GUI) elements of some embodiments.

FIG. 4 illustrates front views of various exemplary graphical user interface (GUI) elements 410-440 of some embodiments. In this example, the GUI elements relate to a pause command. Similar GUI elements can be used for other types of commands or actions. The GUI elements can be semi-transparent, placed at the edge of the playback display area, and/or otherwise be presented in an unobtrusive manner.

In some embodiments, the GUI elements can be automatically invoked based on a received command (e.g., one tap of the pause button). The first GUI 410 can be presented when a pause point has been identified within a consumption profile that is within a certain time threshold (e.g., one minute, five minutes, etc.). In this example, the pause point can be fifteen seconds later along the timeline. A user can then accept the recommended stop point (e.g., by again tapping the pause button) or override the suggestion (e.g., by tapping the pause button twice in succession).

GUI element 420 represents another example where a stop point has been identified fifteen minutes later. GUI element 430 can indicate that no upcoming stop points have been identified within a time threshold (e.g., fifteen minutes, thirty minutes, etc.). GUI element 440 is another example that can indicate the number of seconds or minutes remaining until an identified stop point is available. Such a GUI can be used for various attribute adjustments or similar features (e.g., "press to set volume", "press to adjust color", etc.).

As described above, the various stop points can correspond to features of the content (e.g., scene transitions, end of an episode, etc.), locations along a probability profile where the probability of stopping exceeds a threshold, and/or other appropriate factors.

One of ordinary skill in the art will recognize that various different embodiments can include various different specific GUI elements. Sets of such elements can correspond to various sets of commands, break types, etc. For example, some embodiments can include a "skip" interface. Such an interface can include display of time to skip forward and ahead based on profile information and/or other data (e.g., skip times can match scene breaks in a movie).

IV. Methods of Operation

Figure 5:
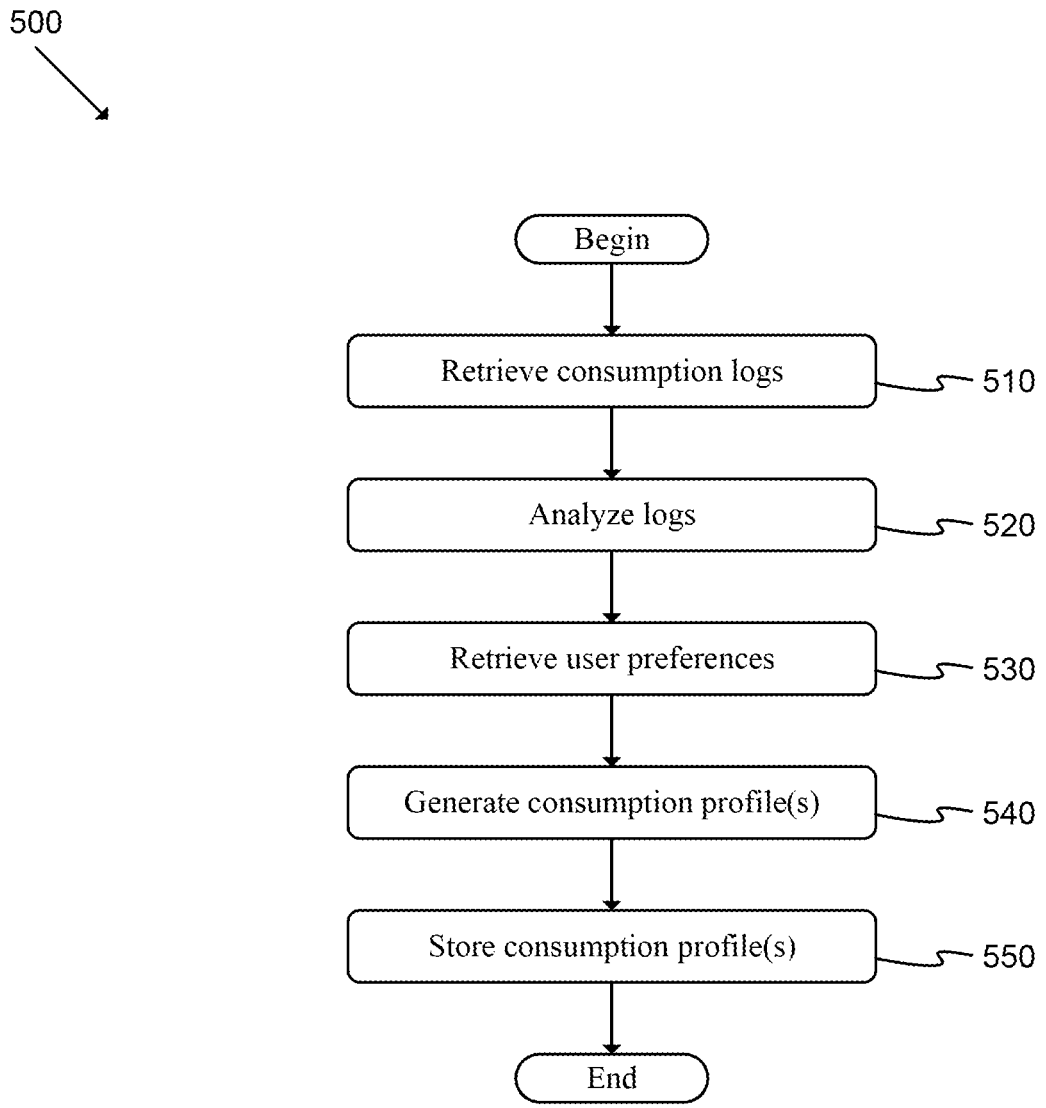
FIG. 5 illustrates a flow chart of an exemplary process used by some embodiments to generate consumption profiles.

FIG. 5 illustrates a flow chart of an exemplary process 500 used by some embodiments to generate consumption profiles. Such a process can be performed by a resource such as profile server 170. The process can begin, for instance, when a user ends a viewing session, when a threshold number of logs becomes available, and/or other appropriate times.

As shown, the process can retrieve (at 510) a set of one or more consumption logs. The logs can be retrieved from a storage or server such as content server 160, storage 165, etc. Such logs can be associated with a single user, single content item, etc. In some embodiments the set of logs can include logs associated with a group of users, where users can be grouped based on various relevant criteria (e.g., age, gender, preferred genres, etc.).

Next, the process can analyze (at 520) the logs. Such analysis can include, for instance, identification of attributes settings and/or adjustments, identification of received commands. When the logs apply to groups of users, the analysis can include averaging of various attribute settings and/or generation of probabilistic models related to the various received commands.

The process can then retrieve (at 530) user preferences. Such preferences can be received from users via various playback resources and/or other resources. The preferences can be retrieved from an element such as content server 160. The preferences can include, for instance, user selected attributes (e.g., number of episodes to play in a row without further user action, color settings, etc.). In addition, the user preferences can include preferences associated with various display devices (e.g., a user can prefer a particular color correction for a television and a different color correction when viewing the same content on a tablet).

Next, process 500 can generate (at 540) one or more consumption profiles based on the analysis performed at 520-530. The consumption profiles can be associated with a user, a content item, a group of users, a genre of content items, device type, device model, etc. The profile can include various discrete values, probabilistic representations, identifying information or matching criteria, and/or other relevant information.

The process can then store (at 540) the consumption profiles and then can end. In some embodiments, existing profiles can be updated based on additional relevant consumption logs and/or user preferences.

Figure 6:
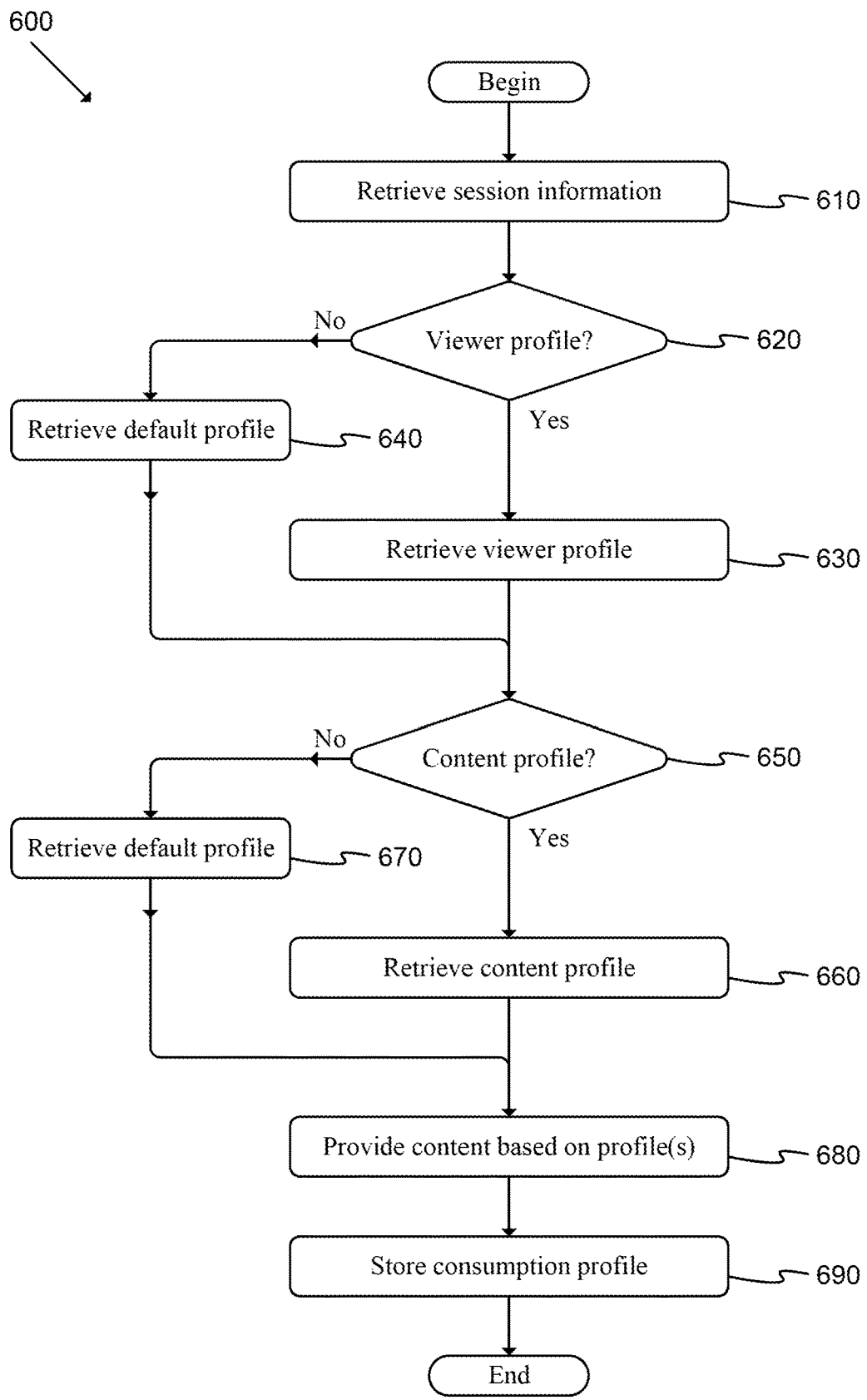
FIG. 6 illustrates a flow chart of an exemplary process used by some embodiments to provide content using consumption profiles.

FIG. 6 illustrates a flow chart of an exemplary process 600 used by some embodiments to provide content using consumption profiles. Such a process can be performed by a resource such as playback control module 180. The process can begin, for instance, when a user begins a viewing session (e.g., by selecting content for playback), when a command is received, and/or other appropriate times.

As shown, the process can retrieve (at 610) session information. Such information can include data such as, user identity, provider identity, display device attributes (e.g., type, model, etc.), and/or other appropriate information.

Next, the process can determine (at 620) whether there is a profile associated with the viewer. Such a profile association can be based on information such as a user identity or account information, device identity and/or association to a user or provider, and/or other relevant criteria. If the process determines (at 620) that a viewer profile is available, the process can retrieve (at 630) the viewer profile.

If the process determines (at 620) that no viewer profile is available, the process can retrieve (at 640) a default viewer profile if available. Such a default profile can be associated with a group of users, provider default settings, and/or otherwise be relevant to the current viewer.

After retrieving (at 630) the viewer profile or retrieving (at 640) the default profile, the process can determine (at 650) whether a content profile is associated with a content item to be presented to the user. Such a content profile can be associated with a specific content item (e.g., a movie, a television episode, etc.), group or genre of content items (e.g., action movies, music videos, etc.), and/or otherwise be relevant to the current viewer or content item.

If the process determines (at 650) that a content profile is available, the process can retrieve (at 660) the content profile. Such a content profile can be at least partly based on aggregate user data (e.g., pause probability versus view time based on data associated with multiple viewers). The content profile can also include content-specific information (e.g., scene transition times). If the process determines (at 670) that no profile is available, the process can retrieve (at 670) a default profile if available. Such a default profile can be associated with a content provider, user selections, etc.

After retrieving (at 660) the content profile or after retrieving (at 670) the default profile, the process can provide (at 680) the content to the viewer based on the retrieved profiles. Such provision can include, for example, automatically adjusting various attributes (e.g., color, volume, etc.). Such adjustments can be made prior to playback and/or during playback. The adjustments can be based on various points associated with a position along a timeline related to the content.

In addition, the adjustments can include additional command options and/or modifications to received commands Several examples of such embodiments are described below in reference to FIGS. 7-9.

After providing (at 680) the content, the process can store (at 690) a consumption profile related to the session and then can end. The consumption profile can include updates to user preferences (e.g., a user can select an alternative menu option related to playback) and/or information related to the current playback session (e.g., command times, adjustments to attributes, number of items consumed, total time, etc.). The stored consumption profile can be associated with other profiles in various appropriate ways (e.g., based on user identity or demographic data, based on genre matching, etc.).

Figure 7:
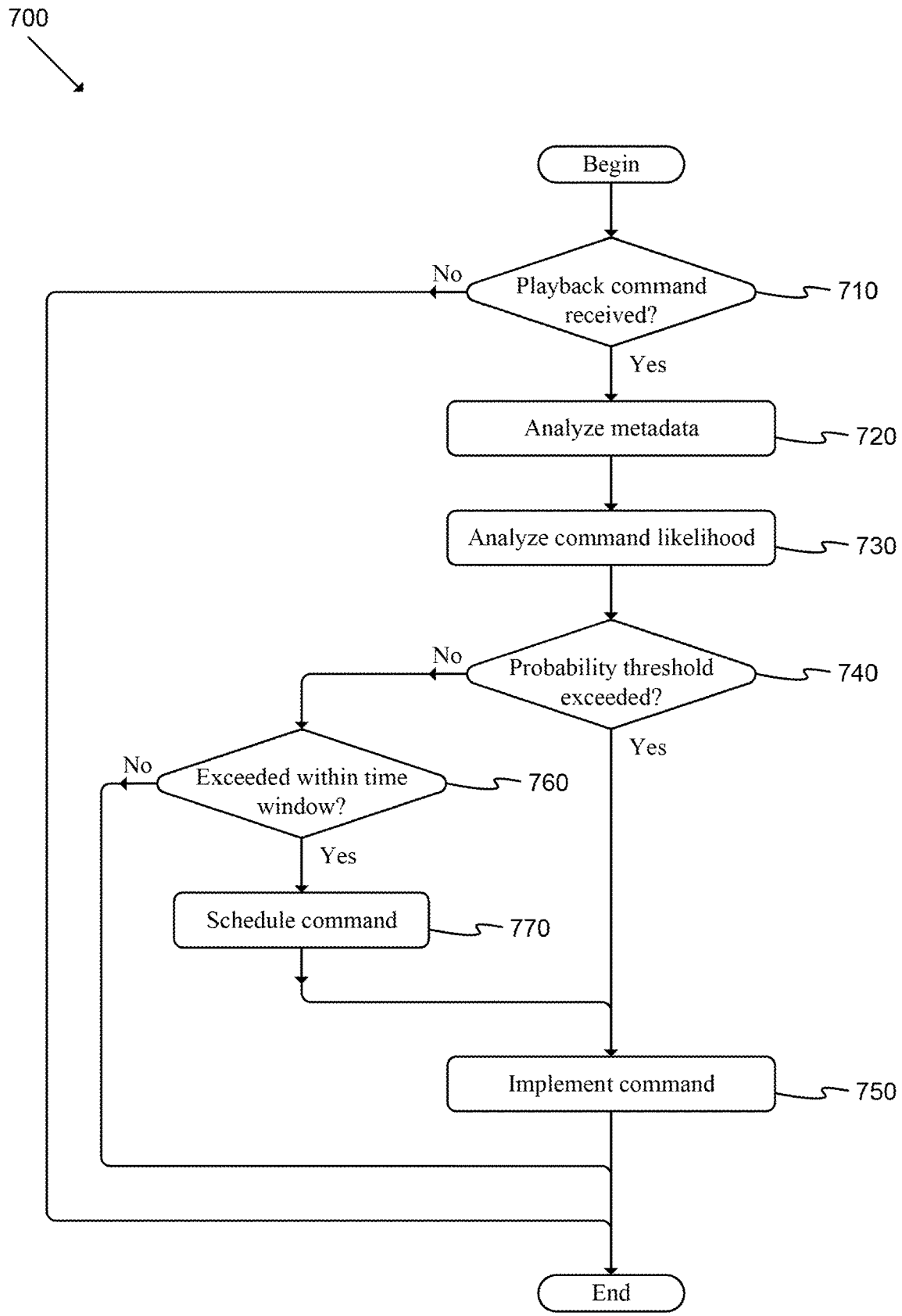
FIG. 7 illustrates a flow chart of an exemplary process used by some embodiments to implement playback commands based on consumption profiles.

FIG. 7 illustrates a flow chart of an exemplary process 700 used by some embodiments to implement playback commands based on consumption profiles. Such a process can be performed by a resource such as playback control module 180. The process can begin, for instance, when a user begins a viewing session (e.g., by selecting content for playback), when a command is received, and/or other appropriate times. In some embodiments, process 700 can be performed as part of operation 680 described above.

As shown, process 700 can determine (at 710) whether a command has been received. Such a command can include, for instance, playback commands such as play, pause, stop, fast forward, rewind, skip, record, etc. In addition to playback commands, some embodiments can determine whether other commands have been received. Such other commands can include attribute adjustments (e.g., changes to brightness, volume, color, contrast, etc.), system commands (e.g., menu, display, input, exit, etc.), and/or other appropriate commands Some embodiments can include a recommend command option where various commands and/or parameter adjustments can be suggested based on attributes of the content, user, etc.

If the process determines (at 710) that no command has been received, the process can end. Otherwise, the process can then analyze (at 720) metadata associated with the provided content item. Such metadata can include, for instance, biographic content information (e.g., genre, length, title, etc.), scene transition times, etc.

Next, the process can analyze (at 730) a command likelihood of the received command Such a command likelihood can be based on a probabilistic representation such as that described above in reference to FIG. 2B.

The process can then determine (at 740) whether a specified probability threshold has been exceeded. Such a threshold can be based on various relevant factors (e.g., user preference, provider preference, prior consumption data, content information, etc.).

If the process determines (at 740) that the threshold has been exceeded, the process can implement (at 750) the command received at 710 and then can end. Implementing the command can include transmitting the command to a display device, content server, and/or other appropriate resource that is able to act on the command.

If the process determines (at 740) that the threshold has not been exceeded, the process can determine (at 760) whether the threshold will be exceeded within a specified time window. Such a window can be, for instance, five or fifteen minutes further along during playback. The window can be at least partly based on user selections.

If the process determines (at 760) that the threshold will be exceeded within the window, the process can schedule (at 770) the command to occur when the threshold is exceeded. Various appropriate UI elements can be used to indicate such scheduling. After scheduling the command, the process can implement (at 750) the command and then can end. If the process determines (at 760) that the threshold will not be exceeded within the window, the process can end.

Figure 8:
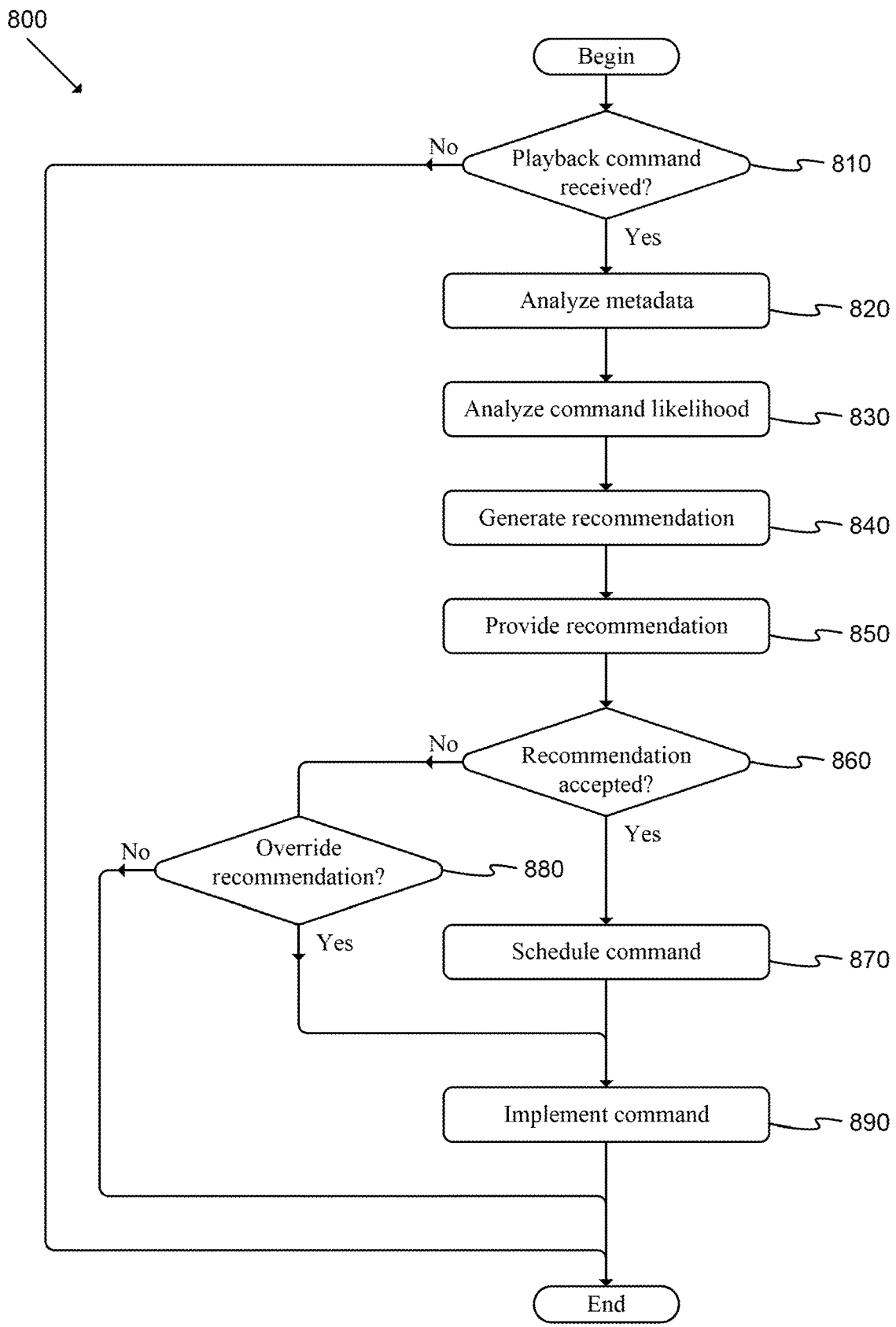
FIG. 8 illustrates a flow chart of an exemplary process used by some embodiments to provide command recommendation and implementation based on consumption profiles.

FIG. 8 illustrates a flow chart of an exemplary process 800 used by some embodiments to provide command recommendation and implementation based on consumption profiles. Such a process can be performed by a resource such as playback control module 180. The process can begin, for instance, when a user begins a viewing session (e.g., by selecting content for playback), when a user logs in to a provider account, and/or other appropriate times. In some embodiments, process 800 can be performed as part of operation 680 described above.

As shown, process 800 can determine (at 810) whether a command has been received. If the process determines that no command has been received, the process can end. If the process determines (at 810) that a command has been received, the process can then analyze (at 820) metadata associated with the content item.

The process can then analyze (at 830) command likelihood. Such analysis can be based on a probabilistic profile such as that described above in reference to FIG. 2B. Next, the process can generate (at 840) a recommendation based on the analysis of metadata, command likelihood, and received command. Such a recommendation can include, for instance, a recommended command (e.g., pause, increase volume, etc.), a recommended command timing (e.g., pause in two minutes, decrease volume before explosion scene, etc.), a recommended content item (e.g., next episode in a series, related content item, etc.), and/or other appropriate recommendations.

Next, the process can provide (at 850) the recommendation. Such a recommendation can be provided in various appropriate ways, for instance using UI element such as those described above in reference to FIG. 4.

Process 800 can then determine (at 860) whether the recommendation has been accepted. Such a determination can be based on, for instance, a user selecting an appropriate UI option. In some embodiments, a user can accept a recommendation by not taking any action for a period of time (e.g., a command can be scheduled unless a user rejects the recommendation within some time limit).

If the process determines (at 860) that the recommendation has been accepted, the process can then schedule (at 870) the command if the process determines (at 860) that the recommendation is not accepted, the process can determine (at 880) whether to override the recommendation. Such a determination can be based on, for example, user inputs (e.g., a user can press a command button again or twice in succession to override a suggestion), profile information, user preference, etc.

If the process determines (at 880) that the recommendation has been overridden or after scheduling (at 870) the command, the process can then implement the command. In the case of an override, the command can be implemented upon determining that the recommendation should be overridden. When the command was scheduled (at 870), the command can be implemented at the scheduled time.

After implementing (at 890) the command or after determining (at 880) that the recommendation was not overridden, the process can end.

Figure 9:
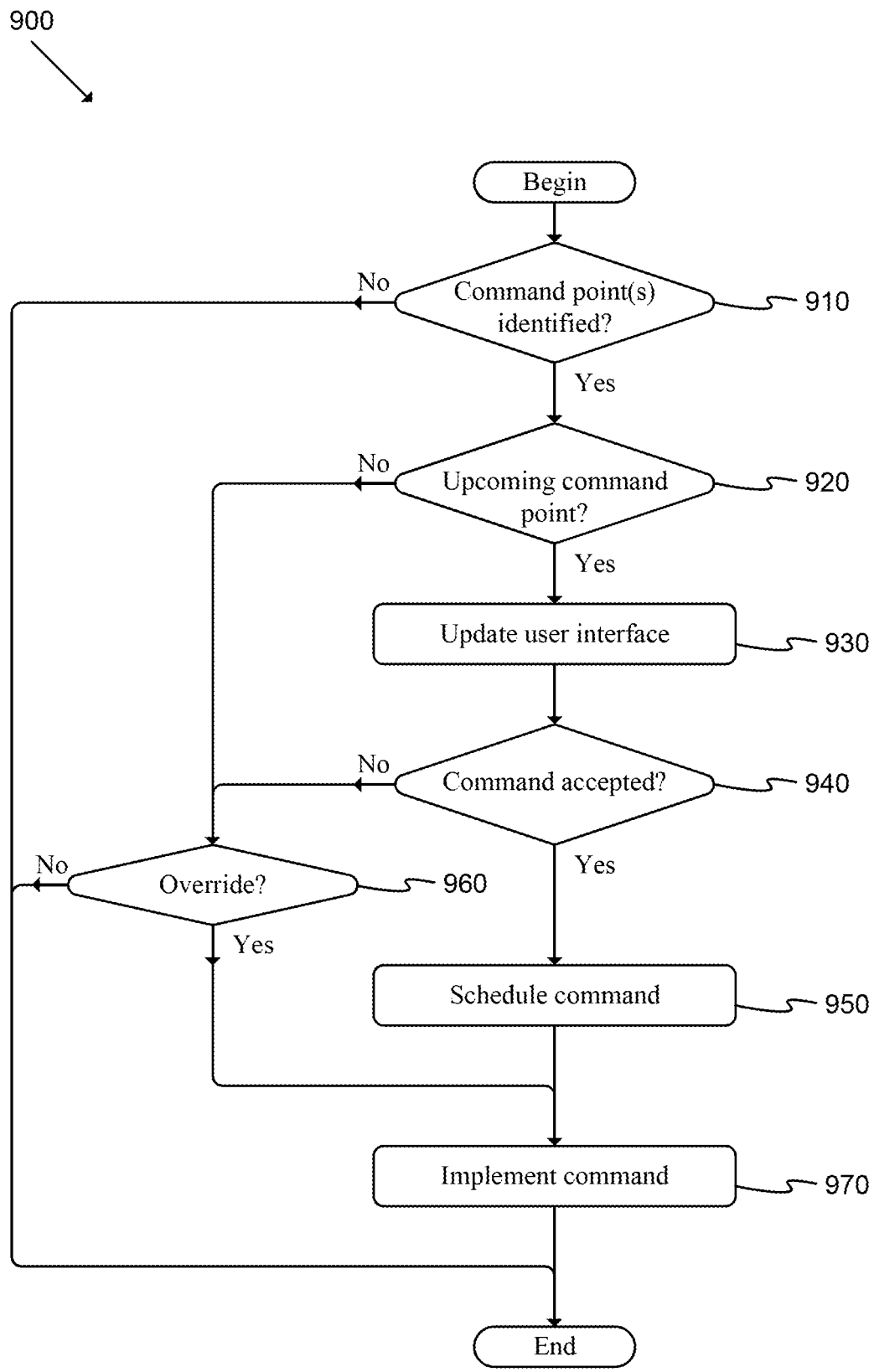
FIG. 9 illustrates a flow chart of an exemplary process used by some embodiments to generate command prompts based on consumption profiles.

FIG. 9 illustrates a flow chart of an exemplary process 900 used by some embodiments to generate command prompts based on consumption profiles. Such a process can be performed by a resource such as playback control module 180. The process can begin, for instance, when a user begins a viewing session (e.g., by selecting content for playback), when a new content item is displayed, and/or other appropriate times. In some embodiments, process 900 can be performed as part of operation 680 described above.

As shown, process 900 can determine (at 910) whether any command points have been identified. Such points can be associated with attribute changes such as those described in reference to FIG. 3. The points can be associated with portions along a probability curve that exceed a threshold, as described above in reference to FIG. 2B. If the process determines (at 910) that no command points have been identified, the process can end.

If the process determines (at 910) that commands points have been identified, the process can then determine (at 920) whether any command points are upcoming. Such a determination can be made based on a time interval from a current position along a timeline to a position associated with the next command point(s). Command points within a threshold interval (e.g., five, ten, or fifteen minutes) can be determined to be upcoming. Such an interval can be set based on various relevant factors (e.g., consumption profile information, user preferences, default value, etc.).

If the process determines (at 920) that there is an upcoming command point, the process can update (at 930) the user interface. Such an update can include presentation of an element such as GUI 440 described above. Next, the process can determine (at 940) whether the suggested command has been accepted. Such a determination can be made based on various factors such as affirmative response received from the viewer, lack of action by the viewer over a threshold time period, etc.

If the process determines (at 940) that the command has been accepted, the process can then schedule (at 950) the command. In some embodiments, the command can be performed upon acceptance when appropriate.

If the process determines (at 920) that no command points are upcoming or the process determines (at 940) that the command was not accepted, the process can determine (at 960) whether the suggested command was overridden. If the process determines that the command was not overridden, the process can end.

If the process determines (at 960) that the command was overridden or after scheduling (at 950) the command, the process can implement (at 970) the command and then can end. Implementation of the command can include performing various actions at the display device (e.g., pausing playback, adjusting volume, etc.), a provider resource such as a content server (e.g., by continuing to provide content over a multi-episode session), and/or other appropriate devices.

In addition to implementing (at 970, 890, or 750) the command or attribute adjustment, some embodiments can perform various additional operations depending on the nature of the command or attributes and/or other relevant factors. For instance, if a user pauses at an unexpected playback time in the evening, an advertisement for delivery pizza can be provided to the user.

One of ordinary skill in the art will recognize that processes 600-900 are exemplary in nature and can be implemented in various different ways without departing from the scope of the disclosure. For instance, some embodiments can omit operations or include additional operations. The operations can be performed in different orders than shown. Some operations and/or sets of operations can be performed iteratively, based on some criteria, at regular intervals, and/or based on other appropriate factors. In addition, the various processes can be divided into multiple sub-processes and/or included as part of a larger macro process.

Although various examples above can refer to "pause" commands, specific presentation attributes (e.g., color, volume), etc., one of ordinary skill in the art will recognize that such processes can be implemented for other commands and/or attributes.

Figure 10:
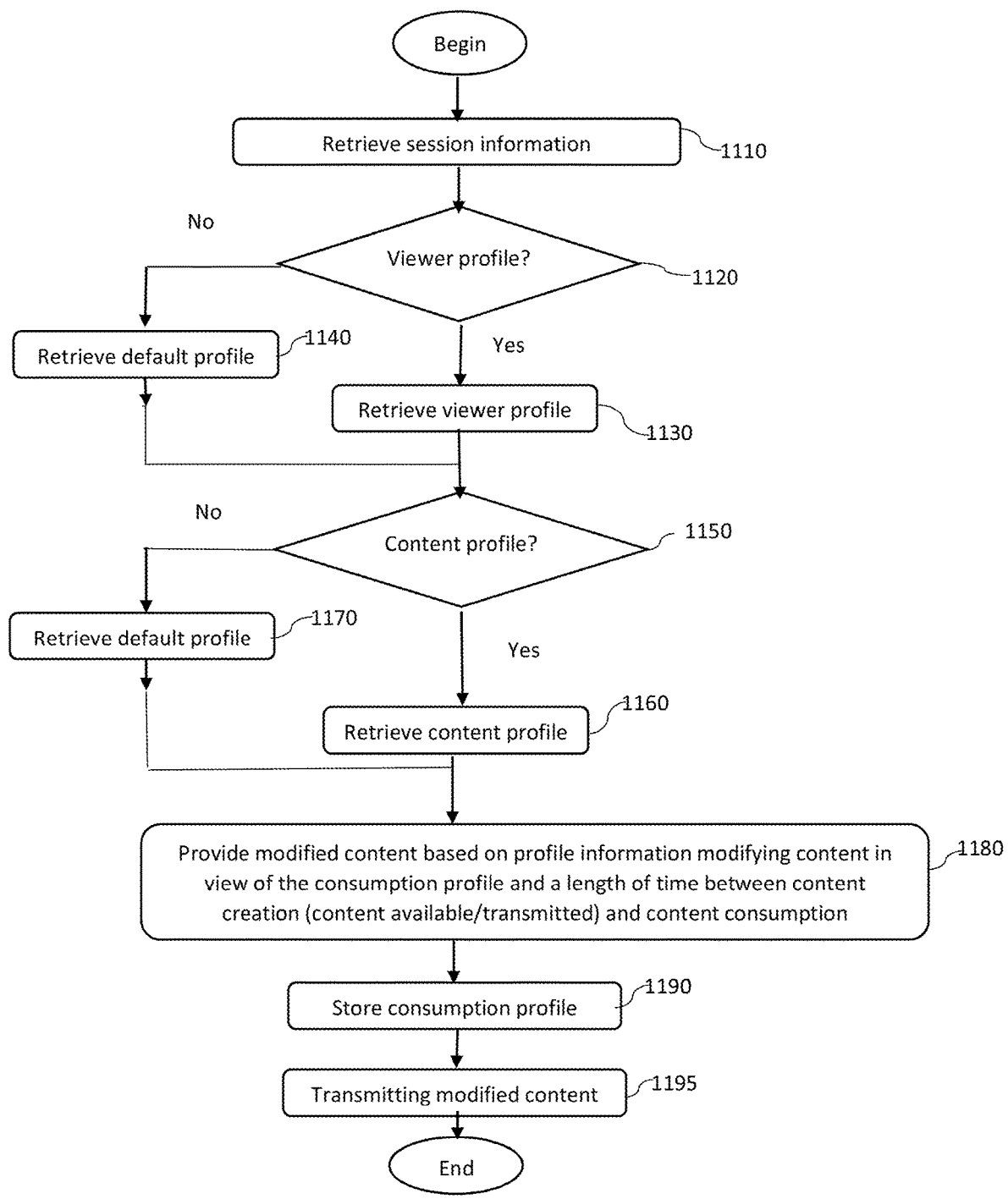
FIG. 10 illustrates a flow chart of an exemplary process used by some embodiments to provide content using consumption profiles.

FIG. 10 illustrates a flow chart of an exemplary process 1100 used by some embodiments to provide content using consumption profiles. Such a process can be performed by a resource such as playback control module 180. Process 1100 discloses an exemplary embodiment where the content that is provided in view of a content profile is further modified based on a time in which the content was created versus when the content is consumed. For example, certain types of content (such as a movie) may not be time sensitive versus other content (such as a news program, sports game, and the like) where the importance of the content can become less relevant as time goes on. Therefore, some content may be provided in a shortened form which gets more abbreviated the further the creation time is from the consumption time.

The process can begin, for instance, when a user begins a viewing session (e.g., by selecting content for playback), when a command is received, and/or other appropriate times.

As shown, the process can retrieve (at 1110) session information. Such information can include data such as, user identity, provider identity, display device attributes (e.g., type, model, etc.), and/or other appropriate information.

Next, the process can determine (at 1120) whether there is a profile associated with the viewer. Such a profile association can be based on information such as a user identity or account information, device identity and/or association to a user or provider, and/or other relevant criteria. If the process determines (at 1120) that a viewer profile is available, the process can retrieve (at 630) the viewer profile.

If the process determines (at 1120) that no viewer profile is available, the process can retrieve (at 1140) a default viewer profile if available. Such a default profile can be associated with a group of users, provider default settings, and/or otherwise be relevant to the current viewer.

After retrieving (at 1130) the viewer profile or retrieving (at 1140) the default profile, the process can determine (at 1150) whether a content profile is associated with a content item to be presented to the user. Such a content profile can be associated with a specific content item (e.g., a movie, a television episode, etc.), group or genre of content items (e.g., action movies, music videos, etc.), and/or otherwise be relevant to the current viewer or content item.

If the process determines (at 1150) that a content profile is available, the process can retrieve (at 1160) the content profile. Such a content profile can be at least partly based on aggregate user data (e.g., pause probability versus view time based on data associated with multiple viewers). The content profile can also include content-specific information (e.g., scene transition times). If the process determines (at 1170) that no profile is available, the process can retrieve (at 670) a default profile if available. Such a default profile can be associated with a content provider, user selections, etc.

After retrieving (at 1160) the content profile or after retrieving (at 1170) the default profile, the process can provide (at 1180) the content to the viewer based on the retrieved profiles where the profiles can be the content profile, the viewer profile, and/or a combination of both types of profiles. Such provision can include, for example, automatically adjusting various attributes (e.g., color, volume, etc.). Such adjustments can be made prior to playback and/or during playback. The adjustments can be based on various points associated with a position along a timeline related to the content.

Specifically, step 1180 is the providing of a modified version of content based on the profile information associated with a user and a calculation that determines how "old" content is from the time such content will be provided. That is, there is a determination that can be made, by using information in profile server 170 to determine what content is to be provided and what parts of such content are to be provided. Part of the determination in step 1180 is governed by the date of creation of content to be provided, this metadata can be stored in a header of such content, stored as metadata embedded in such content, metadata referenced in a separate index, metadata referenced in a separate file, and the like. Note, the date of creation of content can also be, in some exemplary embodiments, when content was first transmitted, made available for streaming from a content provider, available for rental, available for purchase, and the like.

Step 1180 also considers when the provided content is supposed to be provided. Typically, it is expected that after a point of time elapses between when content is created versus when content is provided, certain parts of the content are not as important to a user as when such content was created. As explained previously, parts of certain content (such as news and sporting events) may have less value as time goes on.

Profile server 170 can be enabled to determine what segments of content comport to different subjects and reduce down content into a series of segments instead of providing the complete content. More of the functionally of how content can be broken down into segments is disclosed in connection with an exemplary embodiment described in FIG. 11. The segments of content to be provided will become less in most circumstances as the period of time determined between the time of creation versus the time the content is provided becomes greater. Other factors to be considered for what segments of content to be provided can include a user profile, a profile of other users, the type of content being provided (for example, news programming versus a movie), and the like. Again, step 1180 considers the length of time between content creation and content consumption for selecting the various segments from a piece of content.

After providing (at 1180) the content, the process can store (at 1190) a consumption profile related to the session and then can end. The consumption profile can include updates to user preferences (e.g., a user can select an alternative menu option related to playback) and/or information related to the current playback session (e.g., command times, adjustments to attributes, number of items consumed, total time, etc.). The stored consumption profile can be associated with other profiles in various appropriate ways (e.g., based on user identity or demographic data, based on genre matching, etc.).

In step 1195, the modified content is transmitted to a user for consumption. The delivery of content by server 260 can be to an end user device of a user, a server, a storage medium, and the like. The modified content can be segments of content that at shorter in length than the complete content. In an alternative embodiment, in step 1195, modified content is made available to a user directly from a device. That is, the providing step uses content that is stored within a memory in a device such as a cell phone, tablet, set top box, television, digital video recorder, computer, laptop, and the like where the providing does not need to use a server 260 to obtain content for a current consumption operation. That is, the content in this alternative embodiment is provided from a user device itself which can be consumed on a display device, audio output, and the like that are coupled to the device.

Figure 11:
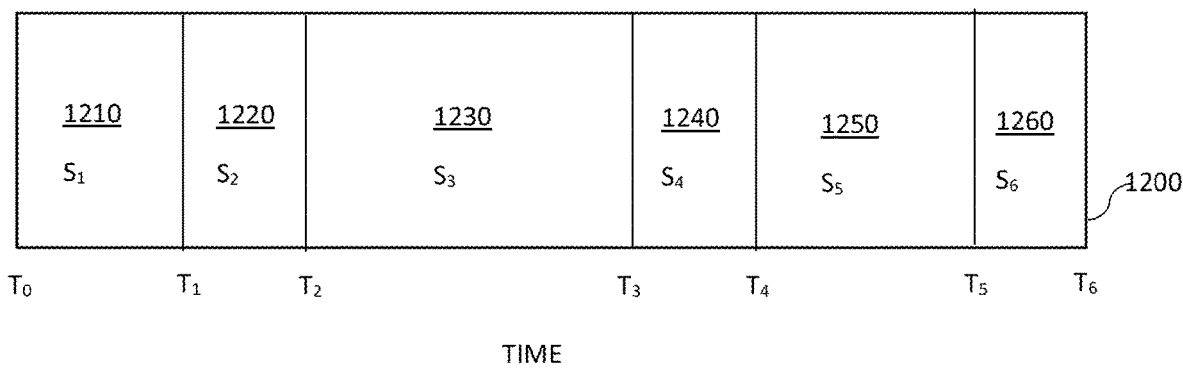
FIG. 11 provides an exemplary illustration on the segmentation of content in accordance with some embodiments.

FIG. 11 provides an exemplary illustration on the segmentation of content in accordance with some embodiments. The content 1200 can be representative of content such as a movie, a television show, a concert, news programming, a sporting event, and the like. The segmentation of the content into different components 1210 (S1), 1220 (S2), 1230 (S3), 1240 (S4), 1250 (S5), and 1260 (S6) represent different parts of content 1200. For example, if content 1200 is representative of a news broadcast, segment 1210 (Time $T_0$ to $T_1$) can be the national news, segment 1220 (Time $T_1$ to $T_2$) can be international news, segment 1230 (Time $T_2$ to $T_3$) can be weather information, segment 1240 (Time $T_3$ to $T_4$) can be business news, segment 1250 (Time $T_4$ to $T_5$) can be a features story, and segment 1260 (Time $T_5$ to $T_6$) can be a recap of the weather information. Note, such segmentations are for illustrative purposes where different content can be broken up into different segments of various time lengths depending on the organization such content. The segmentations can be performed in view of metadata associated with content, timestamps, and the like.

The segments of content to be transmitted (as referenced in step 1180 above) can be delivered in accordance with an exemplary profile shown in TABLE 1. The aspects of the table include the time between the time of the creation of content to the time the content is consumed (shown as range of time values) the segments of content to be delivered, and different categories for users. That is, certain segments for one user may be different than that for a second user where the profile associated with each user may affect what segments are delivered.

TABLE 1

| | Time Between Content Creation to Content Consumption. | | | | |
| --- | --- | --- | --- | --- | --- |
| | 0-24 Hours | 24-48 Hours | 48-72 Hours | 72-96 Hours | 96+ Hours |
| User 1 | S1, S2, S3, S4, S5, S6 | S1, S2, S4, S5 | S1, S2, S5 | S1 | None |
| User 2 | S1, S2, S3, S4, S5, S6 | S1, S2, S4, S5 | S2, S4, S5 | S2, S4, S5 | S2 |
| User 3 | S1, S2, S3, S4, S5, S6 | S1, S2, S5 | S5 | S5 | S5 |

V. Computer System

Many of the processes and modules described above can be implemented as software processes that are specified as one or more sets of instructions recorded on a non-transitory storage medium, memory, and the like. When these instructions are executed by one or more computational element(s) (e.g., microprocessors, microcontrollers, digital signal processors (DSPs), application-specific integrated circuits (ASICs), field programmable gate arrays (FPGAs), etc.) the instructions cause the computational element(s) to perform actions specified in the instructions. I In some embodiments, various processes and modules described above can be implemented completely using electronic circuitry that can include various sets of devices or elements (e.g., sensors, logic gates, analog to digital converters, digital to analog converters, comparators, etc.). Such circuitry can be able to perform functions and/or features that can be associated with various software elements described throughout.

Figure 12:
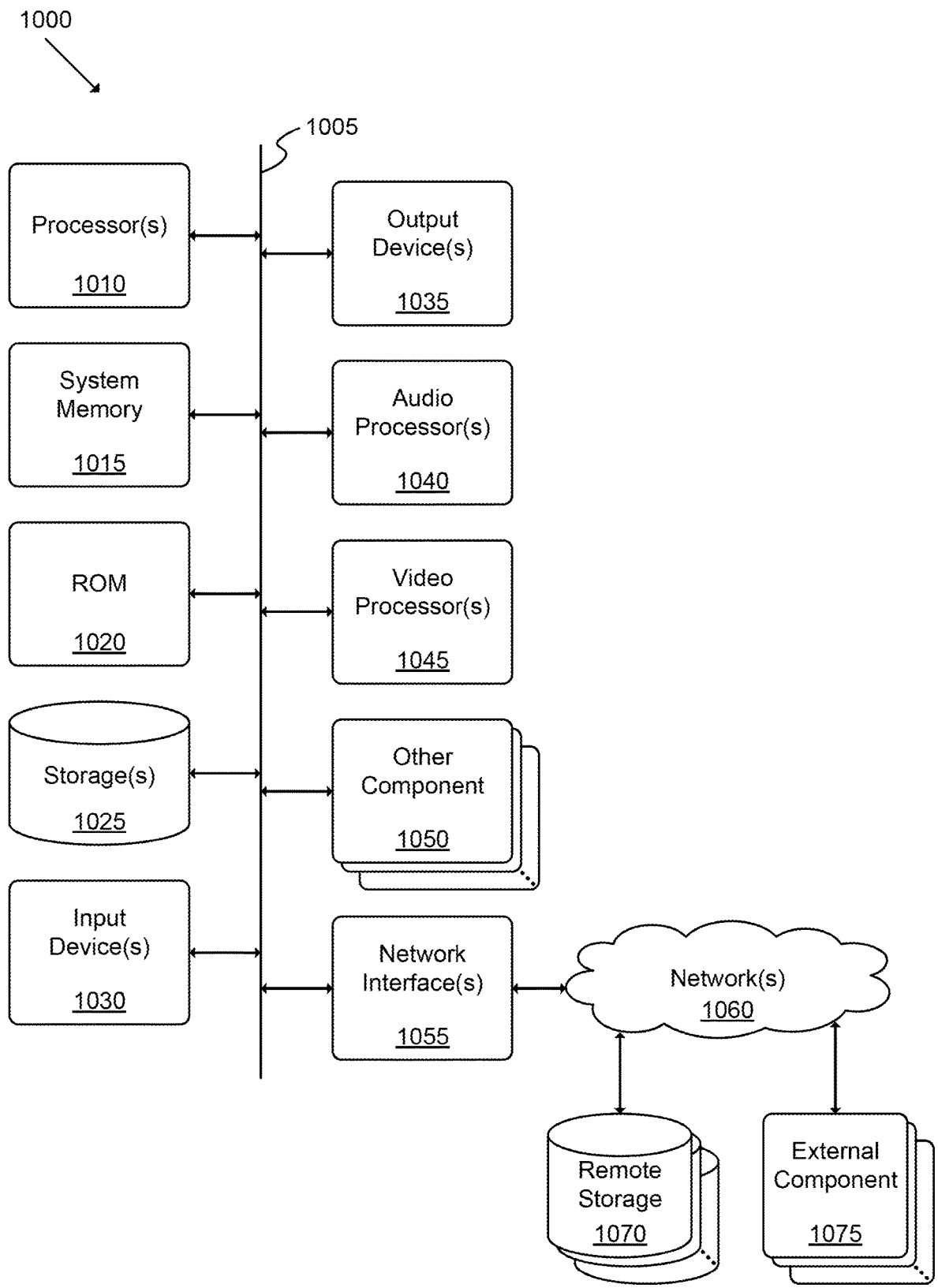
FIG. 12 illustrates a schematic block diagram of an exemplary computer system used to implement some embodiments.

FIG. 12 illustrates a schematic block diagram of an exemplary computer system 1000 used to implement some embodiments. For example, the system described above in reference to FIG. 1 can be at least partially implemented using computer system 1000. As another example, the processes described in reference to FIGS. 5-9 can be at least partially implemented using sets of instructions that are executed using computer system 1000.

Computer system 1000 can be implemented using various appropriate devices. For instance, the computer system can be implemented using one or more personal computers (PCs), servers, mobile devices (e.g., a smartphone), tablet devices, and/or any other appropriate devices. The various devices can work alone (e.g., the computer system can be implemented as a single PC) or in conjunction (e.g., some components of the computer system can be provided by a mobile device while other components are provided by a tablet device).

As shown, computer system 1000 can include at least one communication bus 1005, one or more processors 1010, a system memory 1015, a read-only memory (ROM) 1020, permanent storage devices 1025, input devices 1030, output devices 1035, audio processors 1040, video processors 1045, various other components 1050, and one or more network interfaces 1055.

Bus 1005 represents all communication pathways among the elements of computer system 1000. Such pathways can include wired, wireless, optical, and/or other appropriate communication pathways. For example, input devices 1030 and/or output devices 1035 can be coupled to the system 1000 using a wireless connection protocol or system.

The processor 1010 can, in order to execute the processes of some embodiments, retrieve instructions to execute and/or data to process from components such as system memory 1015, ROM 1020, and permanent storage device 1025. Such instructions and data can be passed over bus 1005.

System memory 1015 can be a volatile read-and-write memory, such as a random access memory (RAM). The system memory can store some of the instructions and data that the processor uses at runtime. The sets of instructions and/or data used to implement some embodiments can be stored in the system memory 1015, the permanent storage device 1025, and/or the read-only memory 1020. ROM 1020 can store static data and instructions that can be used by processor 1010 and/or other elements of the computer system.

Permanent storage device 1025 can be a read-and-write memory device. The permanent storage device can be a non-volatile memory unit that stores instructions and data even when computer system 1000 is off or unpowered. Computer system 1000 can use a removable storage device and/or a remote storage device as the permanent storage device.

Input devices 1030 can enable a user to communicate information to the computer system and/or manipulate various operations of the system. The input devices can include keyboards, cursor control devices, audio input devices and/or video input devices. Output devices 1035 can include printers, displays, audio devices, etc. Some or all of the input and/or output devices can be wirelessly or optically connected to the computer system 1000.

Audio processor 1040 can process and/or generate audio data and/or instructions. The audio processor can be able to receive audio data from an input device 1030 such as a microphone. The audio processor 1040 can be able to provide audio data to output devices 1040 such as a set of speakers. The audio data can include digital information and/or analog signals. The audio processor 1040 can be able to analyze and/or otherwise evaluate audio data (e.g., by determining qualities such as signal to noise ratio, dynamic range, etc.). In addition, the audio processor can perform various audio processing functions (e.g., equalization, compression, etc.).

The video processor 1045 (or graphics processing unit) can process and/or generate video data and/or instructions. For instance, the GUIs of FIG. 4 can be implemented using the video processor. The video processor can be able to receive video data from an input device 1030 such as a camera. The video processor 1045 can be able to provide video data to an output device 1040 such as a display. The video data can include digital information and/or analog signals. The video processor 1045 can be able to analyze and/or otherwise evaluate video data (e.g., by determining qualities such as resolution, frame rate, etc.). In addition, the video processor can perform various video processing functions (e.g., contrast adjustment or normalization, color adjustment, etc.). Furthermore, the video processor can be able to render graphic elements and/or video.

Other components 1050 can perform various other functions including providing storage, interfacing with external systems or components, etc.

Finally, as shown in FIG. 12, computer system 1000 can include one or more network interfaces 1055 that are able to connect to one or more networks 1060. For example, computer system 1000 can be coupled to a web server on the Internet such that a web browser executing on computer system 1000 can interact with the web server as a user interacts with an interface that operates in the web browser. Computer system 1000 can be able to access one or more remote storages 1070 and one or more external components 1075 through the network interface 1055 and network 1060. The network interface(s) 1055 can include one or more application programming interfaces (APIs) that can allow the computer system 1000 to access remote systems and/or storages and also can allow remote systems and/or storages to access computer system 1000 (or elements thereof).

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 1000 can be used in conjunction with some embodiments. Moreover, one of ordinary skill in the art will appreciate that many other system configurations can also be used in conjunction with some embodiments or components of some embodiments.

In addition, while the examples shown can illustrate many individual modules as separate elements, one of ordinary skill in the art would recognize that these modules can be combined into a single functional block or element. One of ordinary skill in the art would also recognize that a single module can be divided into multiple modules.

The foregoing relates to illustrative details of exemplary embodiments and modifications can be made without departing from the scope of the disclosure as defined by the following claims.

I claim:

1. A method comprising:
 identifying a user profile;
 obtaining a modified content from an original content in view of a content consumption based on the user profile, a content type, and a time period between a content creation and said content consumption, wherein different versions of the modified content obtained from said original content based on different user profiles and a same time period between said content creation and said content consumption have different durations; and
 providing said modified content to a device.

2. The method of claim 1, wherein said modified content is at least one segment of said content, where the segment is shorter than the content.

3. The method of claim 2, wherein a segment length for the at least one segment is modified based on the time period between the content creation time and the content consumption.

4. The method of claim 2, further comprising identifying a first user profile and a second user profile.

5. The method of claim 4, wherein different segments are provided to the first user profile and the second user profile.

6. An apparatus comprising:
 a processor for executing a set of instructions; and
 a memory that stores the set of instructions, wherein the set of instructions comprises:
 identifying a user profile;
 obtaining a modified content from an original content in view of a content consumption based on the user profile, a content type, and a time period between a content creation and said content consumption, wherein different versions of the modified content obtained from said original content based on different user profiles and a same time period between said content creation and said content consumption have different durations; and providing said modified content to a device.

7. The apparatus of claim 6, wherein said modified content is at least one segment of said content, where the segment is shorter than the content.

8. The apparatus of claim 7, wherein a segment length for the at least one segment is modified based on the time period between the content creation and the content consumption.

9. The apparatus of claim 7, further comprising identifying a first user profile and a second user profile.

10. The apparatus of claim 9, wherein different segments are provided to the first user profile and the second user profile.

11. The apparatus of claim 6, wherein the apparatus is a server.

12. A method comprising:

determining, for a content, a content type, and a content creation time;

identifying a user profile;

determining a content modification based on the user profile, the content type, and a time period between the content creation time and a time said content is to be consumed;

modifying said content based on the content modification; and providing said modified content to a device associated with the user profile;

wherein, when two or more user profiles are to be provided with said content, and the time period is the same, modifying said content comprises modifying said content so that a duration of the modified content is not the same for the two or more user profiles.

13. The method of claim 12, wherein, when the content type is news or sports, less content is provided as the time period increases.

14. The method of claim 12, wherein said modified content is at least one segment of said content, where the segment is shorter than the content.

15. The method of claim 14, wherein a segment length for the at least one segment is modified based on the time period.

16. The method of claim 14, further comprising identifying a first user profile and a second user profile.

17. The method of claim 16, wherein different segments are provided to the first user profile and the second user profile.

* * * * *